US009646419B2

(12) United States Patent
Bostick et al.

(10) Patent No.: US 9,646,419 B2
(45) Date of Patent: May 9, 2017

(54) AUGMENTED REALITY DEVICE DISPLAY OF IMAGE RECOGNITION ANALYSIS MATCHES

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 14/596,373

(22) Filed: Jan. 14, 2015

(65) Prior Publication Data
US 2016/0203641 A1 Jul. 14, 2016

(51) Int. Cl.
*G06T 19/00* (2011.01)
*G02B 27/01* (2006.01)

(52) U.S. Cl.
CPC ........ *G06T 19/006* (2013.01); *G02B 27/0172* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| 6,757,415 | B1 * | 6/2004 | Rogers | G06K 9/4609 |
| | | | | 382/130 |
| 8,461,984 | B2 | 6/2013 | Hasek et al. | |
| 8,847,953 | B1 * | 9/2014 | Cho | B29C 67/0085 |
| | | | | 345/419 |

(Continued)

FOREIGN PATENT DOCUMENTS

| WO | WO2004/114694 A1 | 12/2004 |
| WO | WO2013/081613 A1 | 6/2013 |

OTHER PUBLICATIONS

Sheng-Tun Li et al, A Snapshot Browsing Model for Web-based Surveillance System in Heterogeneous Computing Environment, AN-8041724, 2001.

(Continued)

*Primary Examiner* — Ashish K Thomas
(74) *Attorney, Agent, or Firm* — Patrick J. Daugherty; Driggs, Hogg, Daugherty & Del Zoppo Co., LPA

(57) ABSTRACT

Aspects provide for notifications of image recognition analysis matches to streamed image data on augmented reality device displays. Data identifies one or more visual appearance attributes of a target object that are discernible within image data acquired by a camera. Image data captured by a camera is analyzed to determine an occurrence of the visual appearance attribute(s) within a stream of images of captured image data. In response to the analyzing determining an occurrence of the visual appearance attribute(s) within the stream of captured images, the method drives a display screen of the augmented reality device to distinguish a possible location of the target object within surroundings (Continued)

of a user of the augmented reality display device that are displayed to the user by the display screen.

17 Claims, 3 Drawing Sheets

(56) References Cited

U.S. PATENT DOCUMENTS

| | | | | |
|---|---|---|---|---|
| 9,033,281 | B1* | 5/2015 | Adams | B64D 9/00 |
| | | | | 244/190 |
| 2013/0005294 | A1 | 1/2013 | Levinson | |
| 2013/0286048 | A1 | 10/2013 | Sternitzke | |
| 2014/0123306 | A1 | 5/2014 | Jung et al. | |
| 2014/0247278 | A1* | 9/2014 | Samara | G06K 17/0016 |
| | | | | 345/633 |
| 2015/0040074 | A1* | 2/2015 | Hofmann | G06T 19/006 |
| | | | | 715/852 |
| 2015/0154802 | A1* | 6/2015 | Song | G08B 5/00 |
| | | | | 345/633 |
| 2015/0283902 | A1* | 10/2015 | Tuukkanen | B60K 35/00 |
| | | | | 340/461 |
| 2015/0305701 | A1* | 10/2015 | Wendler | G01T 1/161 |
| | | | | 600/436 |
| 2016/0134336 | A1* | 5/2016 | Persson | H04B 7/028 |
| | | | | 455/456.1 |

OTHER PUBLICATIONS

IBM, System for displaying alerts or information in an augmented reality system, Nov. 13, 2009, IP.com Prior Art Database Technical Disclosure.

Joshua Verville, Innovation Nation—An Augmented Reality Check, HP Blogs, Dec. 6, 2013.

* cited by examiner

AUGMENTED REALITY DEVICE DISPLAY OF IMAGE RECOGNITION ANALYSIS MATCHES

BACKGROUND

Automated alert systems and distributed systems that use a variety of means to broadcast alerts, including via wireless device SMS text messages, pagers, voice messaging, email, commercial radio stations, Internet radio, satellite radio, television stations, and weather radio systems. Examples include the Emergency Broadcast System (EBS), AMBER ("America's Missing: Broadcast Emergency Response") Alerts and governmental weather system networks. Such systems may be operated by public safety organizations (for example, police, fire and emergency medical systems) in order to convey private messages to organization members, and interested parties may also opt in to receive public alerts on their cellular phones or subscribe to receive messages.

BRIEF SUMMARY

In one aspect of the present invention, a method for notifications of image recognition analysis matches to streamed image data on augmented reality device displays includes receiving, at an augmented reality device, data that identifies one or more visual appearance attributes of a target object that are discernible within image data acquired by a camera. The method further includes analyzing image data captured by the camera to determine an occurrence of the visual appearance attribute(s) within a stream of images of the captured image data, wherein the analyzing the stream of images is performed by an image recognition application executing on a processor of the augmented reality display device that detects the occurrence of the at least one visual appearance attribute within the captured image data stream of images. In response to the analyzing determining an occurrence of the visual appearance attribute(s) within the stream of captured images, the method drives a display screen of the augmented reality device to distinguish a possible location of the target object within surroundings of a user of the augmented reality display device that are displayed to the user by the display screen.

In another aspect, a system has a hardware processor in circuit communication with a camera, a display screen, computer readable memory, and a computer-readable storage medium having program instructions stored thereon. The processor executes the program instructions stored on the computer-readable storage medium via the computer readable memory and thereby receives data that identifies at least one visual appearance attribute of a target object that is discernible within image data acquired by the camera; analyzes, via executing an image recognition application, image data captured by the camera to determine an occurrence of the at least one visual appearance attribute of the target object within a stream of images of the captured image data, by detecting the occurrence of the at least one visual appearance attribute within the captured image data stream of images; and, in response to determining an occurrence of the at least one visual appearance attribute of the target object within the stream of captured images, drives the display screen to distinguish a possible location of the target object within surroundings of a user of the system that are displayed to the user by the display screen.

In another aspect, a computer program product for notifications of image recognition analysis matches to streamed image data on augmented reality device displays has a computer-readable storage medium with computer readable program code embodied therewith. The computer readable program code includes instructions for execution by a processor that cause the processor to receive data that identifies at least one visual appearance attribute of a target object, wherein the at least one visual appearance attribute is discernible within image data acquired by a camera in circuit communication with the processor. The processor also analyzes, via executing an image recognition application, image data captured by the camera to determine an occurrence of the at least one visual appearance attribute of the target object within a stream of images of the captured image data, by detecting the occurrence of the at least one visual appearance attribute within the captured image data stream of images. Lastly, the processor, in response to determining an occurrence of the at least one visual appearance attribute of the target object within the stream of captured images, drives a display screen in circuit communication with the processor to distinguish a possible location of the target object within surroundings of a user of the system that are displayed to the user by the display screen.

BRIEF DESCRIPTION OF THE SEVERAL VIEWS OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
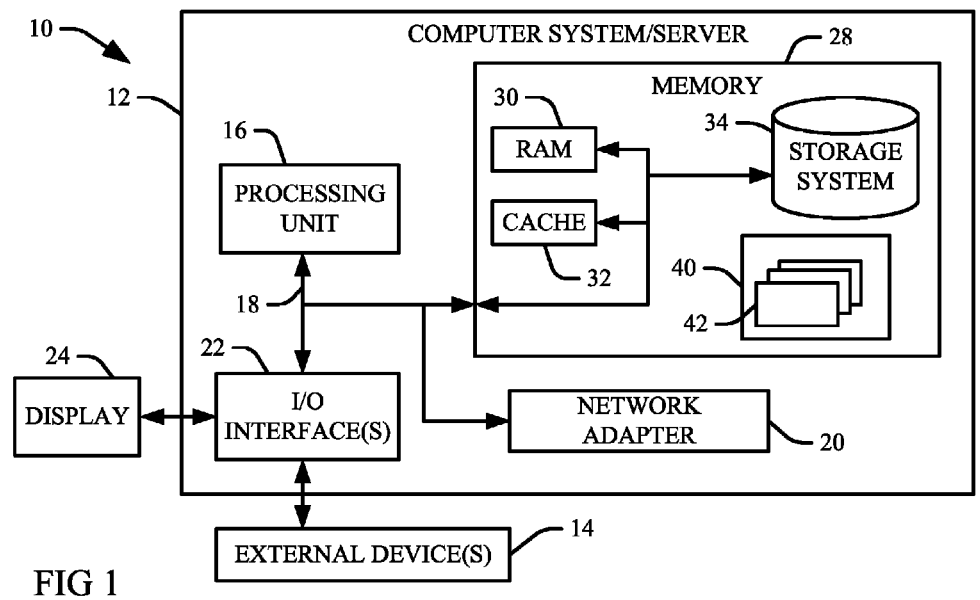
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
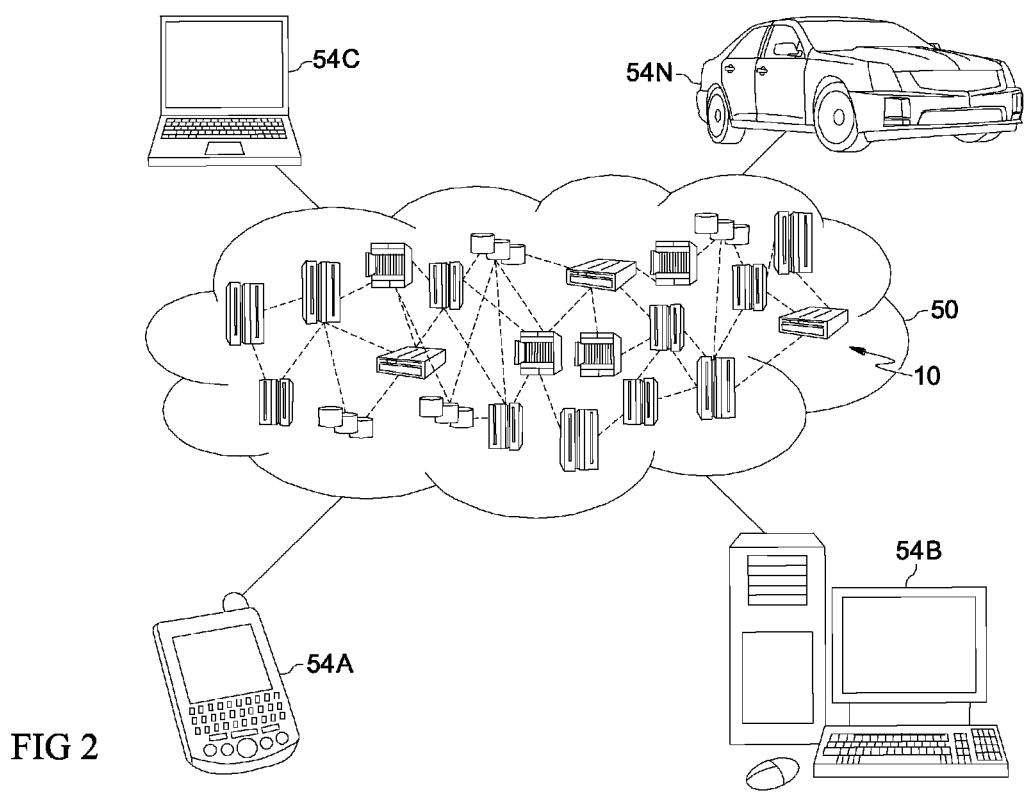
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
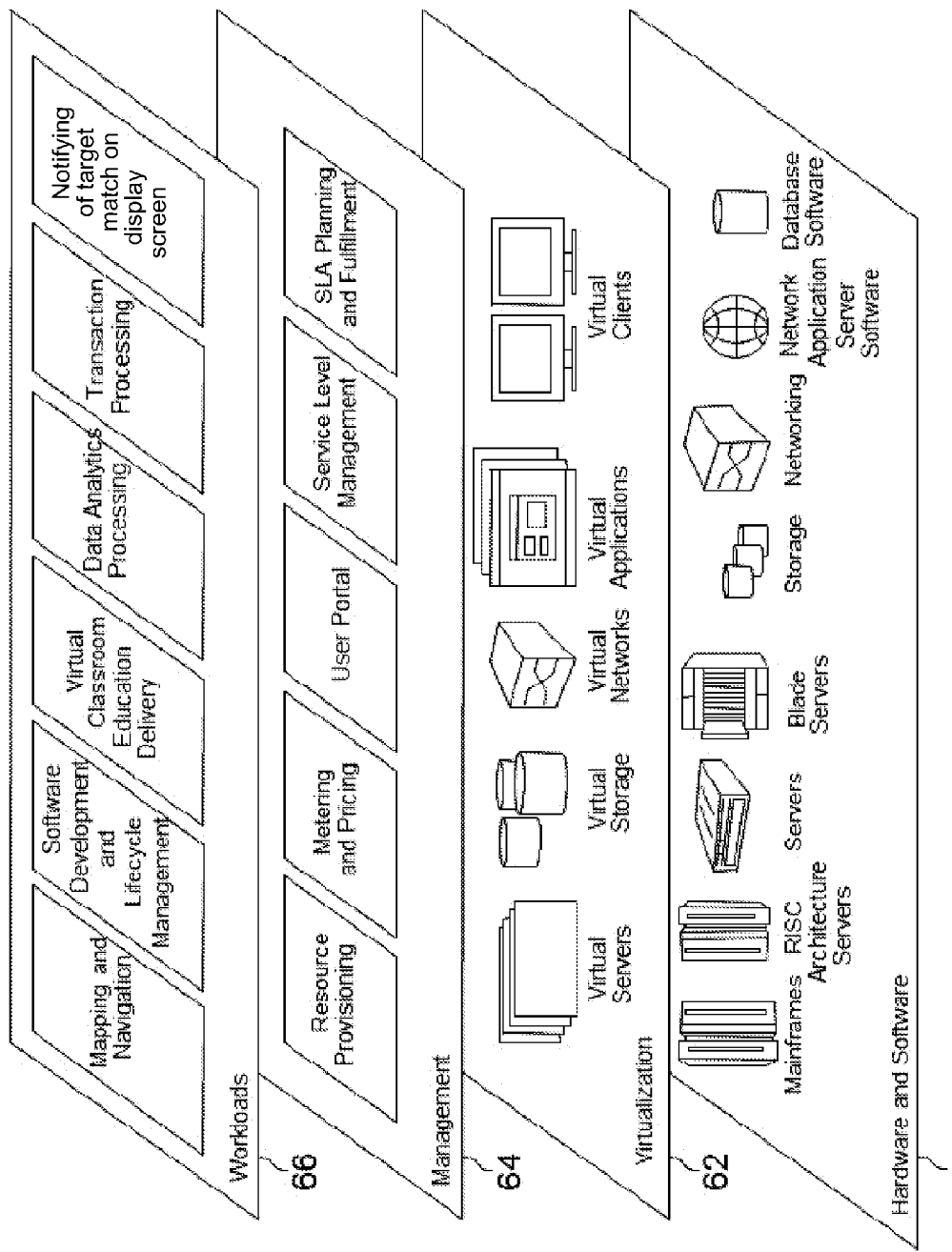
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and notifying of image recognition analysis matches to streamed image data on augmented reality displays (as described more particularly below).

In one aspect, a service provider may perform process steps of the invention on a subscription, advertising, and/or fee basis. That is, a service provider could offer to integrate computer readable program code into the computer system/server 12 to enable the computer system/server 12 to perform process steps of the invention. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

Figure 4:
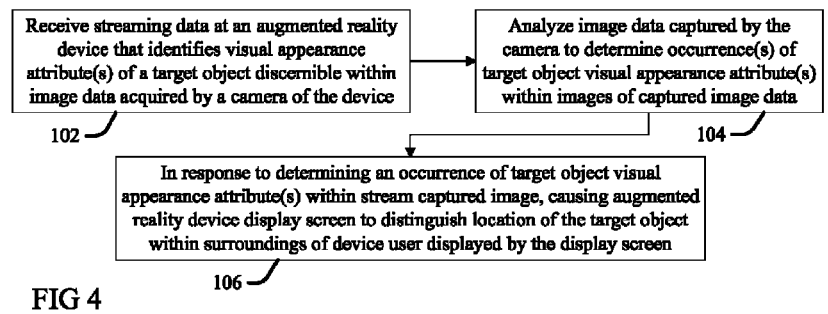
FIG. 4 is a flow chart illustration of a method or process according to the present invention for notifications of image recognition analysis matches to streamed image data on augmented reality device displays.

FIG. 4 illustrates a method or process of an aspect of the present invention for notifications of image recognition analysis matches to streamed image data on augmented reality device displays. At 102 streaming data is received at an augmented reality ("AR") device. Data may be acquired at AR device start up time, for example when an on board computer reads from a centralized database, as well as streamed on an ongoing basis from network communications, for example, via Bluetooth®, Wifi and other local communication technologies. (BLUETOOTH is a trademark of Bluetooth Special Interest Group (SIG) in the United States or other countries.) Some broadcasts may comprise private information that is sent only to the AR devices of police or other law enforcement or governmental authority entities, in order to keep such information confidential or to provide for data security or to otherwise limit the audience for the data.

The streaming data received at 102 identifies one or more visual appearance attributes of a target object that are discernible within image data acquired by a camera of the augmented reality device. Data may be streamed or updated on a continuous basis, including in real time as target identification events occur or are published by authorities or social media, etc. In one example, a server or other computerized device including a processor executes software and can thereby be transformed or transfigured to a programmable broadcast server device that gathers alert data including possible sightings published in private or public domains from private or public, social community, forum or networks (hereinafter "social networks"). Illustrative but not exhaustive examples of social networks include Facebook® and Twitter®, and still others will be apparent to one skilled in the art. (FACEBOOK is a trademark of Facebook, Inc. in the United States or other countries; TWITTER is a trademark of Twitter, Inc. in the United States or other countries.)

At 104 image data captured by the camera is analyzed to determine an occurrence of the target object visual appearance attribute(s) within a stream of images of the captured image data. The analyzing the stream of images is performed by an image recognition application executing on a processor of the augmented reality display device, that detects the occurrence(s) of the visual appearance attribute(s) within the captured image data stream of images. On-board AR device cameras may generate video data streams of images or take snap shots on a periodic basis, as determined by user or image analysis settings and requirements. The acquired image data may be sent to a central server or other AR devices in communication with the AR device, and they may be stored internally, for example for subsequent use in case a match is found. Image data is generally correlated to time of acquisition (temporal data), though this is optional in some applications.

At 106, in response to determining an occurrence of the target object visual appearance attribute(s) within the stream of captured images via analyzing the image data, causing a display screen of the augmented reality display device to highlight a possible location of the target object within surroundings of a user of the augmented reality display device that are displayed to the user by the display screen.

Aspects of the present invention enable the broadcasting of important information from a central repository to pluralities of different augmented reality display devices (at 102, FIG. 1) to enable each device to help in identifying target objects of interest found within their immediate surroundings and visible by cameras of said devices. In some examples, visual appearance attributes that identify and distinguish automobiles may be broadcast, enabling the devices to identify and distinguish stolen vehicles or those identified in amber alerts from other vehicles visible in their immediate surroundings (at 104) and highlight those vehicles within the device display presented to a user (at 106).

Streaming data may be disseminated from a central repository to a user wearing augmented reality (AR) glasses, such as Google Glass™, or other head-mounted mobile devices that enable users to capture pictures of their viewpoint while wearing the glasses/devices. (GOOGLE GLASS is a trademark of Google, Inc. in the United States or other countries.) Vehicles operated by a user may also incorporate such AR glass devices, displaying AR information on windshields and/or side and rear windows, wherein one or more cameras of the device are deployed facing outward from the vehicle to capture images from the surroundings of the vehicle. Thus, amber alert data may be streamed or piped to the AR device comprising a nature of the alert (amber alert, missing person) and visual appearance attributes of a target object of the alert (black Cadillac Escalade, license plate "RUSH2112", etc.).

Image recognition software executing on the AR device (or on a remote server in communication with the device) analyzes individual images streamed from the cameras and thereby may identify occurrences of the visual appearance attributes within the image data and alert user/driver of the AR device in real time that the target vehicle is potentially nearby by highlighting the probable location of the target within the surroundings of the user conveyed through display of the AR device.

AR device display screen elements include spectacle ("glasses") lens worn by a user and windshield and/or side or read windows of vehicles, and still other examples will be apparent to one skilled in the art. The display screens are generally deployed for a user to view his surroundings through, so that information may be displayed on the screens in a semi-transparent or translucent state, for example circling or highlighting or otherwise indicating an object of interest found in the surroundings of the user, such as a vehicle matching amber alert visual appearance attributes streamed to the AR device.

Illustrative but not limiting or exhaustive alert examples include broadcasts to AR devices deployed by police looking for stolen vehicles, missing persons, suspects, etc. Aspects provide advantages over text and audio alert broadcasts taught by the prior art in conveying information to searcher devices in an effective manner that is easier to deploy relative to conventional text-based alert systems. Text and audio alerts require a user to process the information conveyed and actively search their surroundings for the attributes described in the alert information. Thus, if the user reads a text alert for a "black Cadillac Escalade," the user must actively review each vehicle within sight and decide whether it meets each of the requirements and elements of the description, which may involve executing a series of dependent queries ("is it a car or a truck? If a car, is it black" If black, is it a Cadillac? If a black Cadillac, is it an Escalade?" "Does license plate information match alert information?").

In contrast, the AR devices deployed according to the present invention automatically analyze image information acquired by associated cameras on a continual basis, in the background and without requiring the active attention and efforts of a user wearing the AR device, wherein the user may attend to other tasks, such as driving a vehicle incorporating the device. The devices automatically make identification determinations and alert the user to the determination, and may also automatically broadcast such determinations to a centralized dispatch or to other devices deployed by other members of a police department or other organizational entity, entirely without requiring the active attention or intervention of the user deploying the device.

Such broadcasts may also in real-time update the latest possible location of the target object, for example, providing GPS (Geographic Positioning Satellite) coordinates or other geographic location data, in association with time of capture, providing time-stamped images indicated as including the target object, along with geolocation tags or other location and creation.

By combining real time camera stream data with AR device technology aspects can enable users to more efficiently perform ancillary search activities (driving vehicles while paying attention to road conditions, reviewing other report information, completing reports, calling for additional resources, etc.), safely enabling multi-tasking to find target objects faster. Cameras are often already installed for other purposes on police vehicles and regular vehicles (for example, back up cameras are now becoming standard on passenger vehicles). The cost of cameras and image recognition software applications and AR devices and their components is trending downward, and the technology deployed is getting faster and more powerful, enabling continuous streaming of data and determination of information into systems that can be quickly processed by user-deployed AR devices on a broad scale. Thus, AR devices may quickly respond to alert data streams and find and point out to otherwise oblivious users found target objects.

Aspects may determine the location of the target detected, including as a function of a viewing angle of camera and a current GPS coordinate of the device or its camera. The alert process may comprise a series of discrete alerts over a time period of a potential visibility of the target by the AR device, wherein each alert may be associated with a separate image or set of images, and each discrete alert is associated with coordinates of the possible target, or the viewpoint of the camera or screen used to view the possible target. This coordinate data may be streamed in real time to a central authority or other AR device users to help track possible target movements in real time. The data may also be saved, providing history data for subsequent review and analysis.

Aspects may distinguish alerts based on confidence or importance of the alert. Confidence ratings may be made based on the number of attributes detected. For example, a detection of two or more of the visual attributes of the target streamed to the device at 102 may result in an alert with a higher confidence, ranking or indicated importance relative to another alert generated from a detection/match of only one of the attributes. Some matched attributes may be more important than others, or indicate stronger matches to the target object, and thus may be used to rank or categorize respective alerts.

Figure 5:
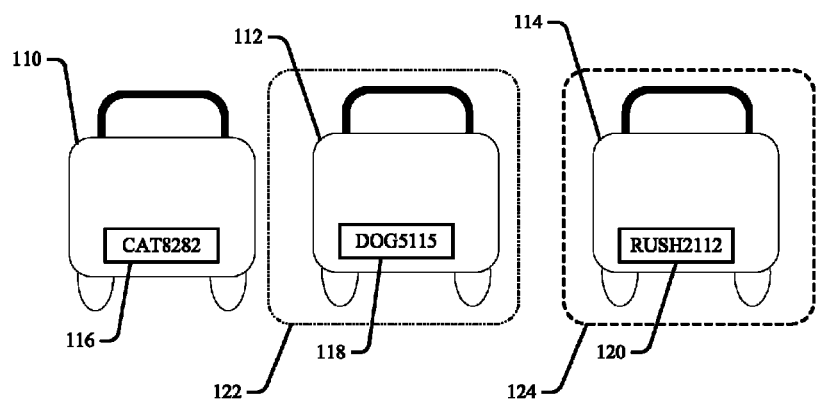
FIG. 5 is a graphical depiction of a notification of an image recognition analysis match to streamed image data on an augmented reality device displays.

FIG. 5 illustrates one example of a user's view through an AR device display according to the present invention, such as a vehicle windshield or a "Google Glass®" type of spectacle lens. The view is coextensive with images captured by a camera of the AR device, wherein the user and the camera have clear views of the rears of three vehicles 110, 112 and 114, including of their respective license plates 116, 118 and 120.

With respect to an alert example of "black Cadillac Escalade, license plate beginning in RUS", vehicles 112 and 114 are both determined to be Cadillac Escalades, while the license plate 120 of vehicle 114 meets the license plate criteria. Thus, vehicle 114 is surrounded with a higher priority/confidence alert highlighting indicator 124, as a function of matching two attributes of the target object (Cadillac Escalade, and license plate beginning in "RUS"), or as a function of matching a strong/more distinctive attribute (license plate beginning in "RUS") relative to other ones of the attributes. As vehicle 112 matches only the Cadillac Escalade attribute (and not the license plate beginning in "RUS" attribute), it is surrounded by a lower priority/confidence alert highlighting indicator 122 that is visually distinctive from the higher priority/confidence alert highlighting indicator 124. This may be a function of matching fewer attributes, or less important, more generic/less distinguishing attributes of the target object. Vehicle 112 matches no target object attributes, and is therefore not highlighted or otherwise marked for review and attention.

The higher confidence alerts may be termed "real" or "high confidence" target object acquisitions and handled as such in notifying the user or others. Thus, in association with the higher priority/confidence alert highlighting indicator 124, the AR device may prompt the user for acknowledgement, store associated images for future reference, and generate target acquisition alerts for broadcast with associated data to a remote authority or other networked AR devices. The real alert data sent may include snap shots, exact location of snap shot acquisition or estimated target position including GPS coordinates, movement of AR device user (for example, "proceeding southbound on Route 183 near Jollyville road at 35 miles-per-hour"), time-stamps of data acquired and sent, and other information deemed helpful or necessary.

If the matching attributes are more generic, and may apply to a large number of objects including the target ("Cadillac Escalade"), then the alert may be treated as a "potential find" or "low confidence alert." For example, where an acquired image of a black Escalade does not reveal enough of a license plate to confirm a match to the broadcast license plate number, or the view of the vehicle is partially occluded and the Escalade model identity cannot be confirmed. A "potential find" alert may be treated differently: the lower priority/confidence alert highlighting indicator 122 may not require acknowledgement of the user or his active attention to review the finding, but wherein the indicator is only intended for review at the user's convenience, even at a subsequent time. Fewer snap shots may be acquired by the AR camera. Alternatively, the lower priority/confidence alert highlighting indicator 122 may prompt the user to review and take action to provide further analysis to determine its significance, such as by repositioning the AR device or himself in such a way as to enable the AR device to make another automatic determination, or for manual review by the user. Thus, the lower priority/confidence alert highlighting indicator 122 may be reviewed and reassessed and either upgraded to a higher priority/confidence alert status (and revising the alert indicator to the higher priority/confidence alert highlighting indicator 124) in response to matching more or more important target object attributes. Alternatively, the lower priority/confidence alert highlighting indicator 122 may be cleared or cancelled entirely, if further attributes or more important data cannot be matched. Thus, potential find alerts may be cleared and omitted from automatic broadcast to central servers or other devices, reducing amounts of false alarm broadcasts.

The target object attributes may be identified by the AR devices via image analysis, wherein image blob data may be distinguished as objects from other object blobs and foreground or background image data, and identified as a function of matching the extracted blobs to learned models of object images, for example matching an extracted image blob data to an image model of a generic automobile, or to a specific image model, in the present example of a Cadillac Escalade. Such processes may readily identify well-known target object shape attributes that are used to train image detectors. License plates and other alpha-numeric data (for example, logos and signs on shirts and hats known to be worn by a target) may be identified by an optical character recognition (OCR) process applied to discernible text logos or signage visible within the acquired image data.

The time and geographic location data of images determined to include target objects or their attributes may be used to determine the confidence value of a given alert. For example, a first high confidence alert may be broadcast for a certain target object sighting generated from an image acquired from another (first) AR device, wherein the GPS location of the image is miles away from a current location of a user's different (second) AR device. If the user's (second) AR device generates an alert for the same target from an acquired image at the user's (second) device, the time of acquisition and distance to the other device image acquired by the first device and user to generate an alert at the first device may be compared. Accordingly, an alert generated by the second device may be given a low priority if it is determined to be unlikely or not possible as a function of comparing the temporal and GPS data of the two alerts: that the target is unlikely to be located at each GPS position at their different times of capture/object attribute recognition. For example, a determination may indicate that the distances between the different GPS coordinates are too far apart to allow for possible or likely movement of the target between the points over differences in acquisition times, that it would have moved between the GPS locations at 350 miles-per-hour to harmonize the different times of acquisition.

The images acquired that result in generated alerts may also be used to determine actual speeds and directions of movements of the target object, or to project and predict them, and such data may be added to attribute data stream to AR devices (at 102). Thus, the confidence of a generated alert may also be dependent on correlation with observed or projected movements of the target object. For example, if a plurality of alerts from different AR devices indicates that the target is headed consistently northbound on a freeway, another alert indicating a sudden southbound movement of the target object (in view of the other alerts, or in view of a series of images acquired by the present device) may be given a low confidence rating, or even discarded as an outlier or anomaly, as inconsistent with speed or direction of movement attributes broadcast at 102 relative to the target object.

In some embodiments, alerts incorporate audio components. For example, text-to-speech applications may announce alert data to users deploying the AR devices, calling the user to attend to and acknowledge a higher priority/confidence alert, or talking the user through a process for assessing the alerts and associated findings. For example, "AR device image analyses are currently reporting twenty (20) unique instances of black Escalades within two miles of your location: probability is low that any one is the missing vehicle absent at least a partial license plate confirmation. Check out parked vehicles but do not stop or pursue any encountered black Escalade that is moving without license plate hit confirmation, or location correlation to most recent GPS data information."

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for presenting notifications of image recognition analysis matches to streamed image data on an augmented reality device display, the method comprising:

receiving, at an augmented reality device, data that identifies at least one visual appearance attribute of a target object, wherein the at least one visual appearance attribute is discernible within image data acquired by a camera of the augmented reality display device;

analyzing image data captured by the camera to determine an occurrence of the at least one visual appearance attribute of the target object within a stream of images of the captured image data, wherein the analyzing the stream of images is performed by an image recognition application executing on a processor of the augmented reality display device that detects the occurrence of the at least one visual appearance attribute within the captured image data stream of images;

in response to the analyzing of the image data determining an occurrence of the at least one visual appearance attribute of the target object within the stream of captured images, driving a display screen of the augmented reality device to distinguish a possible location of the target object within surroundings of a user of the augmented reality display device that are displayed to the user by the display screen, and generating an alert that comprises a time of acquisition of the stream of captured images and a geographic location of the augmented reality device at the time of acquisition of the stream of captured images; and generating a confidence rating of the alert to have a low confidence value as a function of determining that the target object is unlikely to be located at a present location of the augmented reality display device in view of a distance to a location of another augmented reality display device at a time of a generation of another alert by the another augmented reality display device generated in response to an occurrence of at least one visual appearance attribute of the target object within a stream of images of image data captured by a camera of the another augmented reality display device.

2. The method of claim 1, wherein the step of receiving the data that identifies the at least one visual appearance attribute of the target object comprises:
continually receiving a stream of data; and
updating the at least one visual appearance attribute with a new attribute from the stream of data in response to a data broadcast of the new attribute with an alert generated by another augmented reality device, wherein the alert is generated by the another augmented reality device in response to a determination that the at least one visual appearance attribute is discernible within image data acquired by a camera of the another augmented reality device.

3. The method of claim 1, wherein the display screen elements is one of a spectacle lens worn by the user, and a window of a vehicle occupied by the user; and
wherein the display screen is semi-transparent and deployed for the user to view the surroundings of the user through it and to distinguish the possible location of the target object within the surroundings of the user by highlighting an object viewed through the semi-transparent display screen.

4. The method of claim 1, further comprising:
determining a location of the target object as a function of a viewing angle of the camera and a current global positioning coordinate of the device.

5. The method of claim 1, further comprising:
communicating the alert to at least one of a centralized database and another augmented reality device.

6. The method of claim 1, further comprising:
generating the confidence rating of the alert as a function of at least one of a number of at least one visual appearance attributes of the target object determined to occur within the stream of captured images, and an importance of the at least one visual attribute of the target object determined to occur within the stream of captured images.

7. The method of claim 6, further comprising:
generating the confidence rating of the alert to have a high confidence value as a function of determining that two or more of the at least one visual appearance attribute of the target object occur within the stream of captured images, or that one of the at least one visual attributes of the target object determined to occur within the stream of captured images has a high importance.

8. The method of claim 1, further comprising:
integrating computer readable program code into a computer readable storage medium; and
wherein a processor that is in circuit communication with a computer readable memory and the computer readable storage medium executes instructions of the program code integrated on the computer readable storage medium via the computer readable memory and thereby performs the steps of receiving the data that identifies the at least one visual appearance attribute of the target object, analyzing the image data captured by the camera to determine the occurrence of the at least one visual appearance attribute of the target object within the stream of images of the captured image data, driving the display screen of the augmented reality display device to distinguish the possible location of the target object within the surroundings of the user of the augmented reality display device displayed to the user by the display screen and generating the alert in response to the analyzing the image data determining the occurrence of the at least one visual appearance attribute of the target object within the stream of captured images, and generating the confidence rating of the alert.

9. A system, comprising:
a processor;
a computer readable memory in circuit communication with the processor;
a computer readable storage medium in circuit communication with the processor;
a camera in circuit communication with the processor; and
a display screen in circuit communication with the processor;
wherein the processor executes program instructions stored on the computer readable storage medium via the computer readable memory and thereby:
receives data that identifies at least one visual appearance attribute of a target object, wherein the at least one visual appearance attribute is discernible within image data acquired by the camera;
analyzes, via executing an image recognition application, image data captured by the camera to determine an occurrence of the at least one visual appearance attribute of the target object within a stream of images of the captured image data, by detecting the occurrence of the at least one visual appearance attribute within the captured image data stream of images;
in response determining an occurrence of the at least one visual appearance attribute of the target object within the stream of captured images, drives the display screen to distinguish a possible location of the target object within surroundings of a user of the system that are displayed to the user by the display screen, and generates an alert that comprises a time of acquisition of the stream of captured images and a geographic location of the augmented reality device at the time of acquisition of the stream of captured images; and
generates a confidence rating of the alert to have a low confidence value as a function of determining that the target object is unlikely to be located at a present location of the augmented reality display device in view of a distance to a location of another augmented reality display device at a time of a generation of another alert by the another augmented reality display device generated in response to an occurrence of at least one visual appearance attribute of the target object within a stream of images of image data captured by a camera of the another augmented reality display device.

10. The system of claim 9, wherein the display screen elements is one of a spectacle lens worn by the user, and a window of a vehicle occupied by the user; and
wherein the display screen is semi-transparent and deployed for the user to view the surroundings of the user through it and to distinguish the possible location of the target object within the surroundings of the user by highlighting an object viewed through the semi-transparent display screen.

11. The system of claim 10, wherein the processor executes the program instructions stored on the computer-readable storage medium via the computer readable memory and thereby further:
communicates the alert to at least one of a centralized database and another augmented reality device.

12. The system of claim 11, wherein the processor executes the program instructions stored on the computer-readable storage medium via the computer readable memory and thereby further:
generates the confidence rating of the alert as a function of at least one of a number of at least one visual appearance attributes of the target object determined to occur within the stream of captured images, and an importance of the at least one visual attribute of the target object determined to occur within the stream of captured images.

13. The system of claim 12, wherein the processor executes the program instructions stored on the computer-readable storage medium via the computer readable memory and thereby further:
generates the confidence rating of the alert to have a high confidence value as a function of determining that two or more of the at least one visual appearance attribute of the target object occur within the stream of captured images, or that one of the at least one visual attributes of the target object determined to occur within the stream of captured images has a high importance.

14. A computer program product for presenting notifications of image recognition analysis matches to streamed image data on an augmented reality device display, the computer program product comprising:
a computer readable storage medium having computer readable program code embodied therewith, the computer readable program code comprising instructions for execution by a processor that cause the processor to:
receive data that identifies at least one visual appearance attribute of a target object, wherein the at least one visual appearance attribute is discernible within image data acquired by a camera in circuit communication with the processor;
analyze, via executing an image recognition application, image data captured by the camera to determine an occurrence of the at least one visual appearance attribute of the target object within a stream of images of the captured image data, by detecting the occurrence of the at least one visual appearance attribute within the captured image data stream of images;
in response to determining an occurrence of the at least one visual appearance attribute of the target object within the stream of captured images, drive a display screen in circuit communication with the processor to distinguish a possible location of the target object within surroundings of a user of the system that are displayed to the user by the display screen, and generate an alert that comprises a time of acquisition of the stream of captured images and a geographic location of the augmented reality device at the time of acquisition of the stream of captured images; and
generate a confidence rating of the alert to have a low confidence value as a function of determining that the target object is unlikely to be located at a present location of the augmented reality display device in view of a distance to a location of another augmented reality display device at a time of a generation of another alert by the another augmented reality display device generated in response to an occurrence of at least one visual appearance attribute of the target object within a stream of images of image data captured by a camera of the another augmented reality display device.

15. The computer program product of claim 14, wherein the display screen elements is one of a spectacle lens worn by the user, and a window of a vehicle occupied by the user;
wherein the display screen is semi-transparent and deployed for the user to view the surroundings of the user through it and to distinguish the possible location of the target object within the surroundings of the user by highlighting an object viewed through the semi-transparent display screen; and
wherein the computer readable program code instructions for execution by the processor further cause the processor to:
communicate the alert to at least one of a centralized database and another augmented reality device.

16. The computer program product of claim 15, wherein the computer readable program code instructions for execution by the processor further cause the processor to
generate the confidence rating of the alert as a function of at least one of a number of at least one visual appearance attributes of the target object determined to occur within the stream of captured images, and an importance of the at least one visual attribute of the target object determined to occur within the stream of captured images.

17. The computer program product of claim 16, wherein the computer readable program code instructions for execution by the processor further cause the processor to:
generate the confidence rating of the alert to have a high confidence value as a function of determining that two or more of the at least one visual appearance attribute of the target object occur within the stream of captured images, or that one of the at least one visual attributes of the target object determined to occur within the stream of captured images has a high importance.

* * * * *